United States Patent
Chambers et al.

(10) Patent No.: US 7,941,125 B2
(45) Date of Patent: May 10, 2011

(54) MOBILE TELEPHONE-BASED SYSTEM AND METHOD FOR AUTOMATED DATA INPUT

(75) Inventors: Michael J. Chambers, Erlangen (DE); Michael Kiessling, Freising (DE)

(73) Assignee: Agere Systems, Inc., Allentown, PA (US)

( * ) Notice: Subject to any disclaimer, the term of this patent is extended or adjusted under 35 U.S.C. 154(b) by 962 days.

(21) Appl. No.: 10/665,607

(22) Filed: Sep. 19, 2003

(65) Prior Publication Data
US 2005/0064898 A1    Mar. 24, 2005

(51) Int. Cl.
*H04M 3/42* (2006.01)
*H04M 1/00* (2006.01)

(52) U.S. Cl. ............ 455/414.1; 455/550.1; 455/556.1

(58) Field of Classification Search ............ 455/414.1, 455/438, 466, 41.1, 556.1, 550.1, 90.1
See application file for complete search history.

(56) References Cited

U.S. PATENT DOCUMENTS

| | | | |
|---|---|---|---|
| 6,594,503 B1* | 7/2003 | Herzig et al. | 455/550.1 |
| 6,956,833 B1* | 10/2005 | Yukie et al. | 370/328 |
| 6,990,352 B2* | 1/2006 | Pyhalammi et al. | 455/466 |
| 7,266,186 B1* | 9/2007 | Henderson | 379/142.04 |
| 2003/0063575 A1* | 4/2003 | Kinjo | 370/265 |
| 2003/0087650 A1* | 5/2003 | Aarnio | 455/456 |
| 2003/0181200 A1* | 9/2003 | Iida | 455/414.1 |
| 2003/0211856 A1* | 11/2003 | Zilliacus | 455/466 |
| 2003/0224765 A1* | 12/2003 | Udagawa et al. | 455/414.1 |
| 2004/0014460 A1* | 1/2004 | Moroo et al. | 455/414.1 |
| 2005/0014493 A1* | 1/2005 | Ford | 455/418 |

* cited by examiner

*Primary Examiner* — Andrew Wendell

(57) ABSTRACT

A system for, and method of automated data input that employs a mobile telephone as an input device. In one embodiment, the system includes: (1) a mobile telephone having a camera configured to generate an image of a document that contains the data, (2) a processing server adapted to receive the document via a wireless communication network, extract the data from the image and arrange the data according to a format and (3) a database, associated with the interpreter, that receives and stores the data according to the format.

20 Claims, 2 Drawing Sheets

MOBILE TELEPHONE-BASED SYSTEM AND METHOD FOR AUTOMATED DATA INPUT

CROSS-REFERENCE TO RELATED APPLICATION

The present application is related to U.S. patent application Ser. No. 10/695,603 to Chambers, et al., entitled "System and Method Employing a Mobile Telephone to Retrieve Information Regarding an Article," commonly assigned with the present invention, filed concurrently herewith and incorporated herein by reference.

TECHNICAL FIELD OF THE INVENTION

The present invention is directed, in general, to wireless telecommunications and, more specifically, to a mobile telephone-based system and method for automated data input.

BACKGROUND OF THE INVENTION

If a person wants to provide information printed on a document, such as on a business card, into a certain database, currently this is done by initially using an external scanner to get the information in a digital format and by then entering the scanned information into the database, almost always with the need of intermediate processing steps. Because such scanners and other equipment that may be required tends to be bulky and not easily transported, it is typically the case that the document is better brought to the scanner and not the other way around. Unfortunately, bringing the scanner to the document requires forethought which forecloses spontaneous opportunities to obtain data, and bringing the document to the scanner may not be possible.

On the other hand, the information on the document may be directly entered into a database manually. However, problems involved therewith are, for example, the need of an expensive separate additional equipment and/or the consumed amount of time needed for entering the information into a certain database.

What is needed in the art is an automated way to input information printed in a document into a certain database, in particular in an easy, low cost, fast and flexible manner.

SUMMARY OF THE INVENTION

To address the above-discussed deficiencies of the prior art, the present invention provides a system for, and method of automated data input that employs a mobile telephone as an input device.

In one aspect, the present invention provides a system for automated data input. In one embodiment, the system includes: (1) a mobile telephone having a camera configured to generate an image of a document that contains the data, (2) a processing server adapted to receive the document via a wireless communication network, extract the data from the image and arrange the data according to a format and (3) a database, associated with the interpreter, that receives and stores the data according to the format.

In another aspect, the present invention provides a method of automated data input. In one embodiment, the method includes: (1) generating an image of a document that contains the data with a mobile telephone having a camera, (2) receiving the document via a wireless communication network, (3) extracting the data from the image, (4) arranging the data according to a format and (5) storing the data in a database according to the format.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
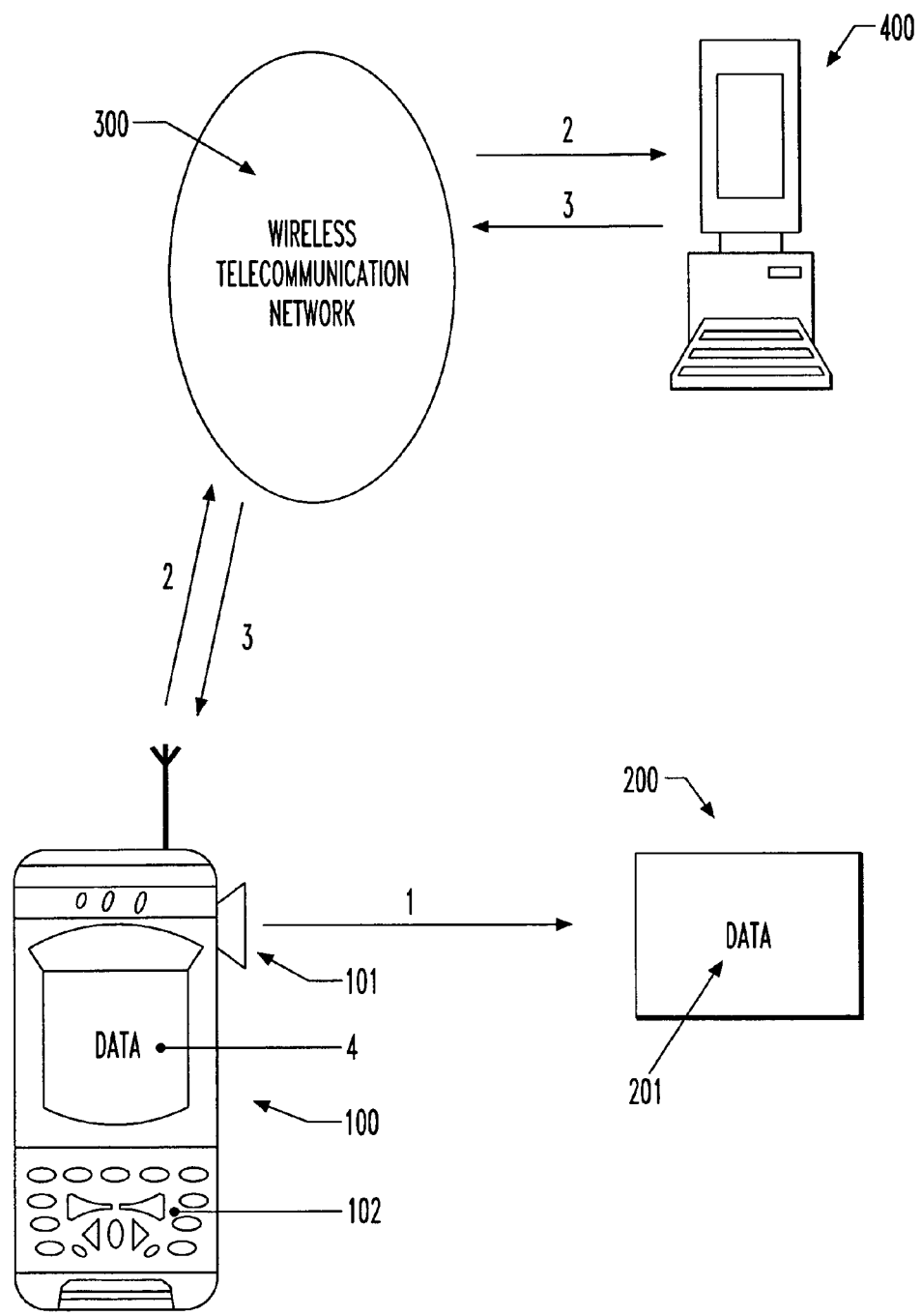
FIG. 1 illustrates a schematic diagram of a mobile telephone-based system for automated data input constructed according to the principles of the present invention.
Figure 2:
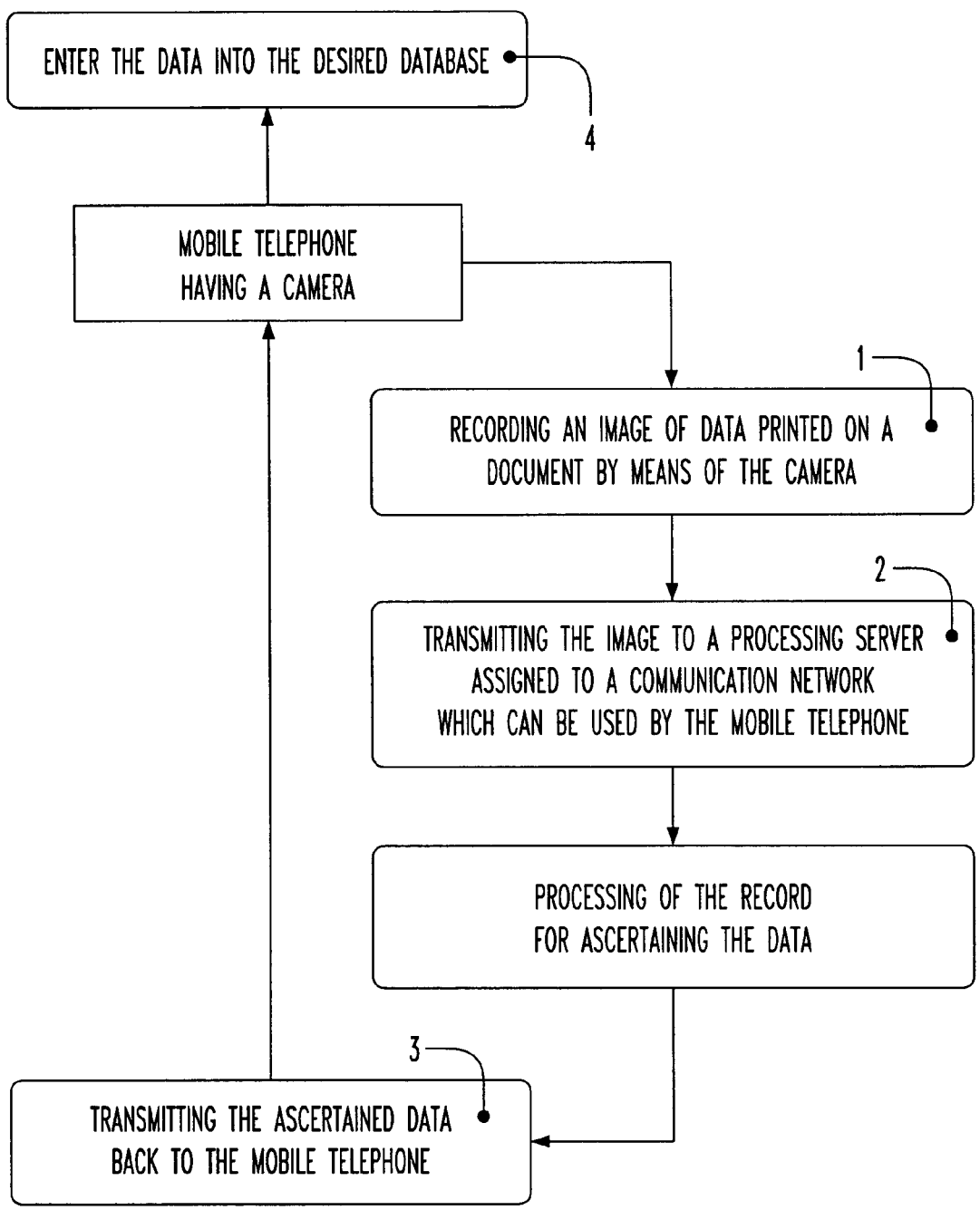
FIG. 2 illustrates a flow diagram of a mobile telephone-based method of automated data input carried out according to the principles of the present invention.

Referring concurrently to FIGS. 1 and 2, illustrated are a schematic diagram of a mobile telephone-based system for automated data input constructed according to the principles of the present invention and a flow diagram of a mobile telephone-based method of automated data input carried out according to the principles of the present invention.

According to FIG. 1, a mobile telephone 100 is depicted having a photo camera 101 mounted to the mobile telephone 100. A document 200 contains data 201 that is desired to be provided to a database. For the following description the document is assumed to be a business card 200 with contact data 201 printed thereon.

If the user of the mobile telephone 100 wants to provide the contact data 201 of the business card 200 to a specific contact database of the mobile telephone 100, a picture of the contact data 201 is recorded, as indicated by reference sign 1, by use of the camera 101 of the mobile telephone 100. The visual record of the contact data 201 then is transmitted via air link, as indicated by reference sign 2, through at least one wireless communication network 300 to a processing server 400, for example a web-based server providing a processing service for processing the transmitted image and to extract the contact data 201 from the image of the business card 201 (document) by recognizing the contact data 201 therein.

For the server-based recognition of the contact data 201, the illustrated embodiment of the processing server 400 uses an optical character recognition system, which is, in the illustrated embodiment implemented by software elements, though hardware recognition equipment is certainly within the scope of the present invention. However, in principle, any other known or future image processing system adapted to recognize data embedded within the image may be used for the processing server 400 based processing and recognition functionality. Moreover, the illustrated processing server 400 additionally uses a spelling correction system for recognizing spelling mistakes and/or errors caused by the record and/or the transmission.

Once the image of the contact data 201 is correspondingly received, the contact data 201 of the business card 200 is recognized (extracted therefrom) and transmitted back, as indicated by reference sign 3 to the mobile telephone 100. At the mobile telephone 100, the received data, as indicated by reference sign 4, may be easily entered into a database (not shown) contained in the mobile telephone 100, for example by pressing a corresponding key or key sequence of the keypad 102 of the mobile telephone 100. To further support the entry, the processing server 400 may put the recognized contact data 201 prior to its transmission 3 into a common database format or in response to data about a certain format, in particular a database format, that is received by the processing server 400 into said certain format. Depending on specific applications for such contact data 201, the initial identification of the mobile telephone 100 may be based, for example, on an International Mobile Subscriber Identification (IMSI). On the other hand, the user of the mobile telephone 100 may send additional data about the desired format. In particular, if the contact data 201 is already put into a desired format by the processing server 400, the mobile telephone 100 may be programmed automatically to perform the final entry into the desired database in response to the receipt of the contact data 201 at the mobile telephone 100.

The transmission of the record, possibly together with additional processing data, from the mobile telephone 100 to the processing server 400 providing the processing service as well as the transmission of the recognized contact data 201 back to the mobile telephone 100 is, in the illustrated embodiment, performed by use of a Multimedia Message Service (MMS) or by use of an e-mail message, perhaps as an attachment thereto. In this regard, it is apparent for a person skilled in the art, that both the mobile telephone 100 and the processing server 400 should be adapted accordingly by the respective interfaces operating for example on a General Packet Radio Service (GPRS) or a Universal Mobile Telecommunications System (UMTS) standard. However, in particular with regard to the transmission of the recognized data, even a Short Message Service (SMS) may be used.

Since a provider possibly wants to charge his server-based service of recognizing data, the processing server 400 may transmit accompanying charge data to a charging system for charging the service use. Such charge data can be directly sent back to the mobile telephone 100 together with the analyzed document data, especially in case a prepaid card is implemented within the mobile telephone 100 or may be transmitted to an external charging system for periodically debiting an account assigned to the mobile telephone or to its registered user.

Although the invention is described with regard to a specific embodiment, the invention is covering several modified embodiments, without leaving the scope of protection as defined by the appended set of claims.

For example, the internal or externally connectable camera of the mobile communication apparatus may be additionally or alternatively designed as being a video camera, so that the record is at least a part of a video sequence. Instead of the described mobile telephone, an other mobile communication apparatus may be used by the invention, for example a Personal Digital Assistant (PDA) or a Mobile Digital Assistant (MDA).

The invention furthermore covers embodiments wherein the possible additional processing data sent from the mobile communication apparatus 100 to the processing server 400 relates to a subscriber address of an other apparatus having accessibility to the at least one wireless communication network 300 and to which the recognized data has to be sent back for entering into a database assigned to said other apparatus in a similar manner. Thus, the processing server 400 may forwards the contact data 201 extracted from the business card 200 to a destination in accordance with received instructions.

The record may be pre-processed prior to its transmission to the processing server 400, for example by the transformation into a format adapted for transmission and/or for the processing server 400. In particular a special application may be provided within the mobile telephone 100 for handling the data transfer, e.g., by using a TCP/IP data link and/or the processing server 400 may provide a special data link format to interact with the mobile telephone 100. Moreover, a plurality of different records may be stored within a memory of the mobile telephone 100 prior to transmit the records all together to the processing server 400.

Although the present invention has been described in detail, those skilled in the art should understand that they can make various changes, substitutions and alterations herein without departing from the spirit and scope of the invention in its broadest form.

What is claimed is:

1. A system for automated contact data input, comprising:
a mobile telephone having a camera configured to generate an image of a printed document containing said contact data in a first format;
a processing server configured to receive said image via a wireless communication network, process said image to recognize said contact data with an image processing system, extract said contact data from said image and arrange said data according to a second format; and
a specific contact database in said mobile telephone, associated with said processing server, that receives and stores said extracted contact data according to said second format, wherein said second format is different from said first format and is consistent with said specific contact database so that said extracted contact data can easily be added to said specific contact database and a user can easily make a call on said mobile telephone using said added extracted contact data.

2. The system as recited in claim 1 wherein said image comprises a video sequence.

3. The system as recited in claim 1 wherein said mobile telephone transmits said image to said processing server by employing a selected one of:
an MMS,
E-mail, and
a special application.

4. The system as recited in claim 1 wherein said image processing system employs optical character recognition to extract said contact data from said image.

5. The system as recited in claim 1 wherein said processing server employs a spelling correction system.

6. The system as recited in claim 1 wherein said processing server forwards said contact data extracted from said image to a destination in accordance with received instructions.

7. The system as recited in claim 1 wherein said wireless communication network conforms to a selected one of:
GPRS, and
UMTS.

8. The system as recited in claim 1 wherein said mobile telephone has a memory configured to store multiple images and transmits said multiple images to said processing server in a batch.

9. The system as recited in claim 1 further comprising a charge system, coupled to said processing server, configured to charge a user for processing of said image.

10. The system as recited in claim 1 wherein said contact data is a portion of said image.

11. A method of automated contact data input, comprising:
generating an image of a printed document in a first format that contains said contact data with a mobile telephone having a camera;
receiving said image at a processing server via a wireless communication network;
processing said image to recognize said contact data with an image processing system;
extracting said contact data from said image;
arranging said data according to a second format consistent with a specific contact database in said mobile telephone and different from said first format;
sending said contact data in said second format from said processing server to said mobile telephone via said communication network; and
storing said contact data in said second format in said specific contact database of said mobile telephone so that said extracted contact data can easily be added to said specific contact database and a user can easily make a call on said mobile telephone using said stored extracted contact data.

12. The method as recited in claim 11 wherein said image comprises a video sequence.

13. The method as recited in claim 11 further comprising transmitting said image from said mobile telephone by employing a selected one of:
an MMS,
E-mail, and
a special application.

14. The method as recited in claim 11 wherein said image processing system employs optical character recognition to extract said contact data from said image.

15. The method as recited in claim 11 further comprising checking a spelling of said contact data extracted from said image.

16. The method as recited in claim 11 further comprising forwarding said contact data extracted from said image to a destination in accordance with received instructions.

17. The method as recited in claim 11 wherein said wireless communication network conforms to a selected one of:
GPRS, and
UMTS.

18. The method as recited in claim 11 wherein said mobile telephone has a memory and said method further comprises storing multiple images and transmitting said multiple images to said processing server in a batch.

19. The method as recited in claim 11 further comprising charging a user for said extracting and said arranging.

20. The method as recited in claim 11 further comprising automatically storing said contact data in said second format in said specific contact database of said mobile telephone.

* * * * *